July 17, 1928.

T. VOGT 1,677,695

AUTOMOBILE HANDLING APPARATUS

Filed Aug. 4, 1926   2 Sheets-Sheet 1

INVENTOR
Theodore Vogt
BY
Joseph F. O'Brien
ATTORNEY

July 17, 1928.
T. VOGT
1,677,695
AUTOMOBILE HANDLING APPARATUS
Filed Aug. 4, 1926 2 Sheets-Sheet 2
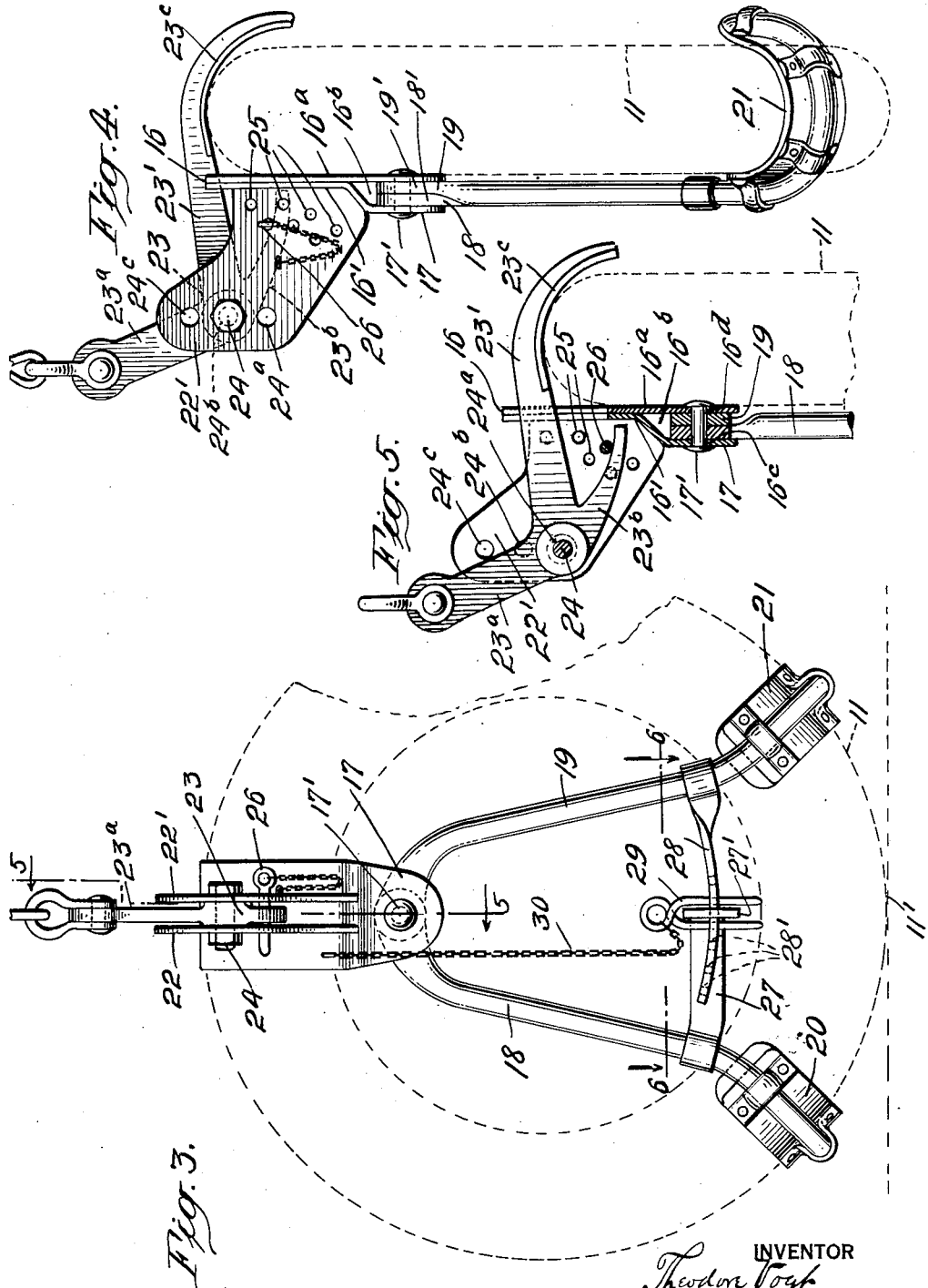
INVENTOR
Theodore Vogt
BY
Joseph F. O'Brien
ATTORNEY Patented July 17, 1928.

1,677,695

UNITED STATES PATENT OFFICE.

THEODORE VOGT, OF FAIRVIEW, NEW JERSEY.

AUTOMOBILE HANDLING APPARATUS.

Application filed August 4, 1926. Serial No. 126,991.

This invention relates to improvements in automobile handling apparatus, especially adapted for hoisting and lowering motor vehicles in completely assembled condition aboard ships or railway cars.

One of the objects of this invention is to enable vehicles and especially automobiles, in completely assembled condition, to be raised and lowered with safety aboard ships and railway cars.

Another object of my invention is to enable automobiles to be handled without danger of scratching, marring or denting the wheel fenders and other polished surfaces.

Still another object of the invention is to provide a wheel clamp which when fastened to a wheel will effectually retain its hold thereon irrespective of any change in diameter of the wheel due to deflation or "flattening" of the tire during the hoisting operation.

Another object of this invention is to provide a handling apparatus which may be readily and quickly applied to an automobile wheel and released therefrom while the same is on the ground without any jacking-up or other manipulation of said wheel.

Another object of the invention is to provide an automobile wheel clamp in which the weight of the car will tend to tighten the clamp on the wheel.

Another object of my invention is to provide a clamp which may be effectively locked to automobile wheels of varying diameters and to permit the handling of automobiles of all sizes and types without being altered in any way.

Another object of the invention is to provide an automobile wheel clamp having three points of clamping contact all of which are adjustable relatively to each other and all of which may be effectively locked in varying given positions.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:—

Fig. 3 is an enlarged side elevation of one of the wheel clamps shown in Fig. 1 applied to an automobile tire;

Fig. 4 is an edge elevation of a wheel clamp shown in operative relationship to an automobile tire;

Fig. 5 is a vertical section on the line 5—5 of Fig. 3 showing the pivot lowered and upper end of a clamp applied to a wheel of smaller diameter than that shown in Figs. 3 and 4;

Figure 1:
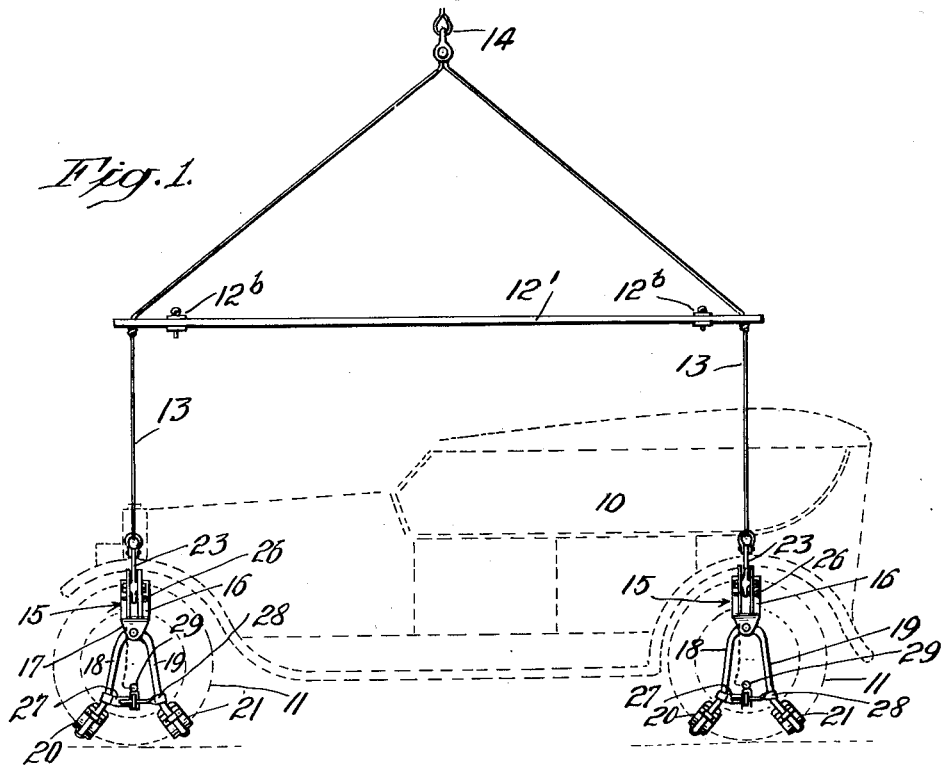
Fig. 1 is a side elevation of an automobile shown in dotted lines with my improved hoisting apparatus applied thereto.
Figure 2:
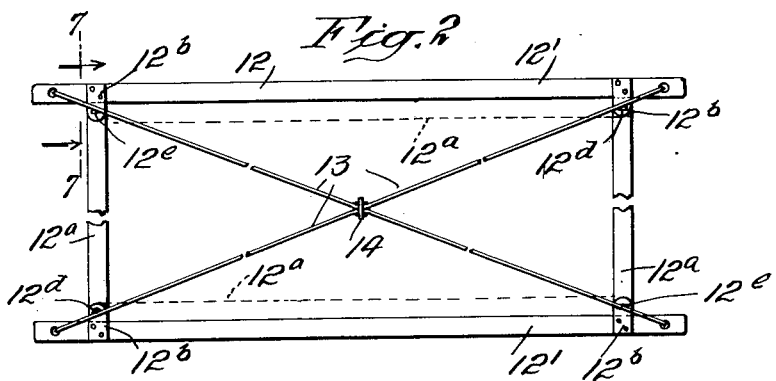
Fig. 2 is a plan view of the spreader preferably employed by me.
Figure 6:
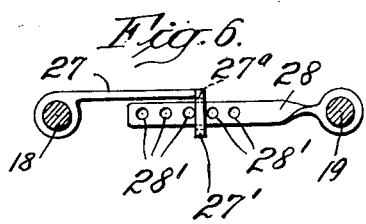
Fig. 6 is a section on the line 6—6 of Fig. 3, looking in the direction of the arrow.
Figure 7:
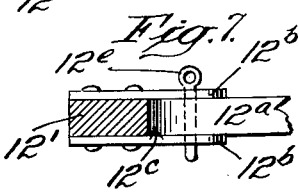
Fig. 7 is a section on the line 7—7 of Fig. 2, looking in the direction of the arrow.

Referring now to these drawings which illustrate a preferred form of my invention, 10 indicates an automobile body, 11 the wheels thereof which are the only parts of the automobile engaged by my improved handling apparatus.

My improved apparatus comprises primarily four wheel-engaging clamps 15 each of which are adapted to be applied to and locked in engagement with one of the wheels of an automobile, all four of such clamps being connected together by ropes passing through a rectangular spreader 12 and converging to and fastened together at a central point by an eye or clevis so as to form sling ropes 13 for the wheels which may be jointly engaged by a hook 14 of a hoisting and lowering apparatus.

As illustrated, the spreader consists of longitudinal members 12′ each having a transverse member 12ª pivotally connected by bolts 12ᵈ to plates of a projection 12ᵇ, the other end being arranged to enter within a groove 12ᶜ formed between similar projection plates 12ᵇ and to be fastened to said longitudinal member by pins 12ᵉ.

The clamps are preferably identical in construction and have a base or head-plate 16 provided preferably at its lower end with a pivot-bearing 17 for diverging legs 18 and 19 respectively which, in the preferred embodiment shown, are pivoted on a common pivot 17' mounted at the lower end of said base plate 16. As illustrated, said base plate is composed of two members comprising outer and inner plates 16', 16ᵃ one of which at its lower end is spaced or offset from the other to provide a bearing pocket 16ᵇ within which the upper ends of the two legs 18 and 19 are fitted and pivoted by a common pivot pin 17' passing through apertures 16ᶜ, 16ᵈ (see Fig. 5) in said plates and through bearing holes formed in flattened portions 18', 19' of said legs, which are thus pivoted to swing laterally on the pivot 17'. Each leg is provided at its outer end with shoe-plates 20 and 21 adapted on movement outwardly away from each other to provide space for the tire of an automobile and on movement toward each other to engage the periphery of a tire or shoe on opposite sides of the ground contacting portion 11' thereof.

Mounted at the upper end of said base member and extending, as shown, at a right angle therefrom is a pair of spaced bearing plates 22, 22' between which is pivotally mounted on a pivot 24 an angular clamping lever 23 comprising a leg portion 23' adapted to extend beyond said plate and engage the tire of an automobile to clamp the same thereto, and an attaching-arm 23ᵃ at the opposite side of said pivot 24 which preferably extends from said leg portion at an angle slightly greater than a right angle, so that the load or weight of the automobile may be utilized to apply a slight pressure downwardly on the tire-engaging arm 23' of said lever and because of its inclination from the vertical to automatically compensate for any decrease in the diameter of the tire due to deflation or "flattening" during handling.

Means is provided for locking said lever arm 23' in its position in engagement with the tire, and in the preferred embodiment illustrated, I provide a locking arm 23ᵇ integral with the lever 23 and extending between the bearing plates and beneath the tire-engaging arm 23. This locking-arm is adapted to cooperate in varying positions of said lever 23 with one of a series of holes 25 pierced through the bearing plates 22, 22' so that when the lever arm 23 is fastened in engagement or contact with a tire 11, a pin 26 preferably anchored on one of said bearing plates may be inserted through apertures or holes 25 intersecting the path of movement of said locking arm 23ᵇ, the pin 26 being so inserted above the said arm 23ᵇ to hold a shoe plate 23ᶜ at the outer end of the arm 23' in effective locking engagement with the tire and to prevent any upward movement thereof while permitting a downward pressure to be exerted thereon by the weight of the load.

It will be obvious that while the arm is locked in contact with the tire and cannot move away from the same, a "flattening" or deflation of the tire which would cause a reduction relatively small or variation of the diameter of the wheel will be automatically compensated for because the pressure of the weight of the car is utilized to press the lever arm 23' against the tire.

While in the normal position of the parts shown in Fig. 4, the clamp may be fastened to tires 11 of diameters which vary to some extent, I have also provided means by which wheels of greatly increased or greatly decreased diameter may be clamped, and for this purpose I have shown the lever 23 to be demountable and have provided pivot holes 24ᵃ, 24ᵇ and 24ᶜ in the plates, the pivot holes 24ᵃ and 24ᶜ being located above and below the normal pivot 24ᵇ so that in the event an automobile having very large tires is handled, the pivot may be raised to the upper hole and in handling automobile wheels of small diameter, the pivot point may be lowered. In any case, the lever 23 may be locked in tire-engaging position by engagement of the integral locking arm 23ᵇ with the pin 26 extending through one of the adjusting holes 25.

The diverging pivoted legs 18 and 19 are preferably locked in adjusted position on the wheel and for this purpose, I preferably provide one leg with a locking arm 27 having a projection 27' provided with a locking aperture 27ᵃ while the other leg has a locking tongue adapted to be inserted in the aperture 27ᵃ of said member 27 and also is provided with a series of holes 28. In the embodiment shown, a double-legged cotter pin 29 is anchored by a chain 30 to the base plate and is adapted to have its opposite legs straddle the apertured projection 27' and enter holes 28' in the arm or tongue 28 at opposite sides thereof, thus securely locking the members or arms together and therefore locking the foot plates on the said legs in engaging position against the rim of the tire.

It will be seen from the above that I have provided a clamp having a three point contact with the tire of the wheel; that two of these contact points are at opposite sides of the ground-contacting portion of the tire and the other point at the top of the tire in substantially vertical alignment with said ground-contacting portion; that the two side legs are pivoted on a common pivot to swing laterally and are thus adjustable in relation to each other; that the top arm is movable at a right angle to said laterally movable arms and perpendicular to the plane of the wheel; that the side-clamping arms are adjustable to permit attachment thereof, without contact with the ground, on varying sizes of automobile tires and that the top clamp is arranged to automatically take up or compensate for any variation due to "flattening" or deflation of a tire during handling and the device is furthermore further adjustable to permit clamping engagement with wheels of greatly varying diameters.

Having described my invention, I claim:—

1. An automobile handling apparatus embodying, in combination, a series of automobile clamps for engaging the wheels of automobiles, each comprising a base member having pivotally mounted thereon rigid legs having free ends movable pivotally to engage the wheel tire at opposite sides of the ground-contacting portion thereof, and a top-engaging lever also pivotally mounted on said base member and movable pivotally to engage and clamp an automobile wheel between said top-engaging lever and said diverging side legs, and means for locking said pivotally movable legs and top-engaging members in wheel-clamping position.

2. An automobile handling apparatus embodying, in combination, a series of automobile clamps for engaging the wheels of automobiles, each comprising a base-plate, a pivot mounted in said base-plate, diverging side legs mounted to swing on said pivot and adapted to engage the wheel tire at opposite sides of the ground-contacting portion thereof, another pivot mounted in said base-plate, a top-engaging lever movable about said last-mentioned pivot to swing in relation to the side legs to clamp therebetween an automobile wheel, and means for adjusting the distance between the pivots of the legs and arms to permit clamping of the tires of varying diameters.

3. An automobile handling apparatus embodying, in combination, a series of automobile clamps for engaging the wheels of automobiles, each comprising a base-plate, a pivot mounted in said base-plate, diverging side legs mounted to swing on said pivot and adapted to engage the wheel tire at opposite sides of the ground-contacting portion thereof, another pivot mounted in said base-plate, a top-engaging lever movable about said last-mentioned pivot to swing in relation to the side legs to clamp therebetween an automobile wheel, and means for locking said clamps in relation to each other and in contact with an automobile wheel.

4. An automobile handling apparatus embodying, in combination, a series of automobile clamps for engaging the wheels of automobiles, each comprising a base-plate, a pivot mounted in said base-plate, diverging side legs movable to swing on said pivot laterally and adapted to engage the wheel tire at opposite sides of the ground-contacting portion thereof, another pivot mounted in said base-plate and a top-engaging lever having an arm movable on said last-mentioned pivot at a right angle to the plane of movement of said divergent legs to clamp an automobile wheel between said arm and leg members.

5. An automobile handling apparatus embodying, in combination, a series of automobile clamps for engaging the wheels of automobiles, each comprising a base-plate, a pivot mounted in said base-plate, diverging side legs movable to swing on said pivot laterally and adapted to engage the wheel tire at opposite sides of the ground-contacting portion thereof, another pivot mounted in said base-plate and a top-engaging lever having an arm movable on said last-mentioned pivot at a right angle to the plane of movement of said divergent legs to clamp an automobile wheel between said arm and leg members, and means for locking said arm in locking position against movement.

6. An automobile handling apparatus embodying, in combination, a series of automobile clamps for engaging the wheels of automobiles, each comprising a base-plate, a pivot mounted in said base-plate, diverging side legs movable to swing on said pivot laterally and adapted to engage the wheel tire at opposite sides of the ground-contacting portion thereof, another pivot mounted in said base-plate and a top-engaging lever having an arm movable on said last-mentioned pivot at a right angle to the plane of movement of said divergent legs to clamp an automobile wheel between said arm and leg members, means for locking said arm in locking position against movement, and means for locking said legs against separating movement.

7. An automobile handling apparatus embodying, in combination, a series of automobile clamps for engaging the wheels of automobiles, each comprising a base-plate, a pivot mounted in said base-plate, diverging side legs mounted to swing on said pivot and adapted to engage the wheel tire at opposite sides of the ground-contacting portion thereof, another pivot mounted in said base-plate, a top-engaging lever movable about said last-mentioned pivot to swing in relation to the side legs to clamp therebetween an automobile wheel, said locking lever being angular and having a contacting-arm and an attaching arm extending therefrom at an angle arranged to apply a portion of the pressure of the weight of the load on the tire to compensate for variation in the diameter due to deflation thereof.

8. An automobile handling apparatus, embodying, in combination, a series of automobile clamps for engaging the wheels of automobiles, each comprising a base-plate, a pivot mounted in said base-plate, diverging side legs mounted to swing on said pivot and adapted to engage the wheel tire at opposite sides of the ground-contacting portion thereof, another pivot mounted in said base-plate, a top-engaging lever movable about said last-mentioned pivot to swing in relation to the side legs to clamp therebetween an automobile wheel, said locking lever being angular and having a contacting-arm and an attaching arm extending therefrom at an angle arranged to apply a portion of the pressure of the weight of the load on the tire to compensate for variation in the diameter due to deflation thereof, and means for locking said lever arm in tire-engaging position.

9. An automobile handling apparatus, embodying, in combination, a series of automobile clamps for engaging the wheels of automobiles, each comprising a base-plate, a pivot mounted in said base-plate, diverging side legs mounted to swing on said pivot and adapted to engage the wheel tire at opposite sides of the ground-contacting portion thereof, another pivot mounted in said base-plate, a top-engaging lever movable about said last-mentioned pivot to swing in relation to the side legs to clamp therebetween an automobile wheel, said locking lever being angular and having a contacting-arm and an attaching arm extending therefrom at an angle arranged to apply a portion of the pressure of the weight of the load on the tire to compensate for variation in the diameter due to deflation thereof, means for locking said lever contacting-arm in tire-engaging position, and means for locking said diverging legs in fixed relative position.

In witness whereof, I have signed my name to the foregoing specification.

THEODORE VOGT.